US011902029B2

(12) United States Patent
Rubin et al.

(10) Patent No.: US 11,902,029 B2
(45) Date of Patent: Feb. 13, 2024

(54) APPARATUS, SYSTEM AND METHOD OF WIRELESS COMMUNICATION ACCORDING TO A HYBRID AUTOMATIC REPEAT REQUEST (HARQ) SCHEME

(71) Applicant: INTEL CORPORATION, Santa Clara, CA (US)

(72) Inventors: Amir Rubin, Kiryat Ono (IL); Ehud Reshef, Qiryat Tivon (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/763,641

(22) PCT Filed: Dec. 25, 2019

(86) PCT No.: PCT/US2019/068511
§ 371 (c)(1),
(2) Date: Mar. 24, 2022

(87) PCT Pub. No.: WO2021/133390
PCT Pub. Date: Jul. 1, 2021

(65) Prior Publication Data
US 2022/0376841 A1  Nov. 24, 2022

(51) Int. Cl.
*H04L 1/1829* (2023.01)
*H04L 1/00* (2006.01)
*H04L 1/1812* (2023.01)

(52) U.S. Cl.
CPC .......... *H04L 1/1835* (2013.01); *H04L 1/0045* (2013.01); *H04L 1/1816* (2013.01)

(58) Field of Classification Search
CPC ....... H04L 1/18; H04L 1/1812; H04L 1/1816; H04L 1/1819; H04L 1/1835;
(Continued)

(56) References Cited

U.S. PATENT DOCUMENTS

2010/0005356 A1*  1/2010  Cho ...................... H04L 1/1812
714/751
2010/0272033 A1  10/2010  Fwu et al.
(Continued)

FOREIGN PATENT DOCUMENTS

KR  10-2010-0005294  1/2010

OTHER PUBLICATIONS

International Search Report and the Written Opinion for International Application No. PCT/US2019/068511, dated Sep. 21, 2020, 11 pages.

(Continued)

*Primary Examiner* — Peter Chen
(74) *Attorney, Agent, or Firm* — Shichrur & Co.

(57) ABSTRACT

Some demonstrative embodiments may include an apparatus including a Hybrid Automatic Repeat Request (HARQ) buffer configured to buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and a decoder configured to decode a retransmission of the data block according to the HARQ scheme based on combined LLR values, which are based on the compressed LLR values and on LLR values corresponding the retransmission of the data block, wherein a HARQ gain of decoding the retransmission of the data block based on the combined LLR values is at least 2 Decibel (dB) for an Additive White Gaussian Noise (AWGN) channel.

25 Claims, 7 Drawing Sheets

(58) Field of Classification Search
CPC ... H04L 1/1841; H04L 1/1845; H04L 1/1864; H04L 1/004; H04L 1/0045

See application file for complete search history.

(56) References Cited

U.S. PATENT DOCUMENTS

| | | | |
|---|---|---|---|
| 2011/0231725 | A1 | 9/2011 | Gotman et al. |
| 2014/0192857 | A1 | 7/2014 | Perets et al. |
| 2015/0109996 | A1 | 4/2015 | Lee et al. |
| 2017/0207884 | A1 | 7/2017 | Jiang et al. |
| 2019/0053230 | A1* | 2/2019 | Andersson ............ H04L 1/1822 |

OTHER PUBLICATIONS

International Preliminary Report on Patentability for International Application No. PCT/US2019/068511, dated Jul. 7, 2022, 8 pages.
Search Report for European Patent Application No. 19957826.1, dated Aug. 2, 2023, 13 pages.

Anton Laktyushkin et al.: "An adaptive Log-likelihood Ratio compression algorithm for Downlink Shared Channel processing in LTE receiver", 2013 International Soc Design Conference (ISOCC), IEEE, Nov. 17, 2013 (Nov. 17, 2013), pp. 1-4, XP032625201, DOI: 10.1109/ISOCC.2013.6864015 [retrieved on Jul. 24, 2014].
Yongbin Wei: "Performance Gain Evaluation of HARQ Operation", 3GPP2 Draft; C30-20030414-075R2-QCOM HARQ Gains, 3rd Generation Partnership Project 2, 3GPP2, 2500 Wilson Boulevard, Suite 300, Arlington, Virginia 22201; USA, vol. TSGC May 5, 2003 (May 5, 2003), pp. 1-9, XP062141516, Retrieved from the Internet: URL:http://ftp.3gpp2.org/TSGC/Working/2003/2003-04-Coeur-d'Alene/TSG-C-2003-04-Coeur-d'Alene/WG3/ [retrieved on May 5, 2003].
Rosati S et al.: "LLR Compression for BICM Systems Using Large Constellations", IEEE Transactions On Communications, IEEE Service Center, Piscataway, NJ. USA, vol. 61, No. 7, Jul. 1, 2013 (Jul. 1, 2013), pp. 2864-2875, XP011522193, ISSN: 0090-6778, DOI: 10.1109/TCOMM.2013.052113.120776.

* cited by examiner

APPARATUS, SYSTEM AND METHOD OF WIRELESS COMMUNICATION ACCORDING TO A HYBRID AUTOMATIC REPEAT REQUEST (HARQ) SCHEME

TECHNICAL FIELD

Embodiments described herein generally relate to wireless communication according to a Hybrid Automatic Repeat Request (HARQ) scheme.

BACKGROUND

A Hybrid Automatic Repeat Request (HARQ) operation may tie retransmissions to Physical layer (PHY) Forward Error Correction (FEC) blocks, where a receiver stores FEC decoder inputs for failed FEC blocks, and may combine the FEC decoder inputs for the failed FEC blocks with related retransmission inputs.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
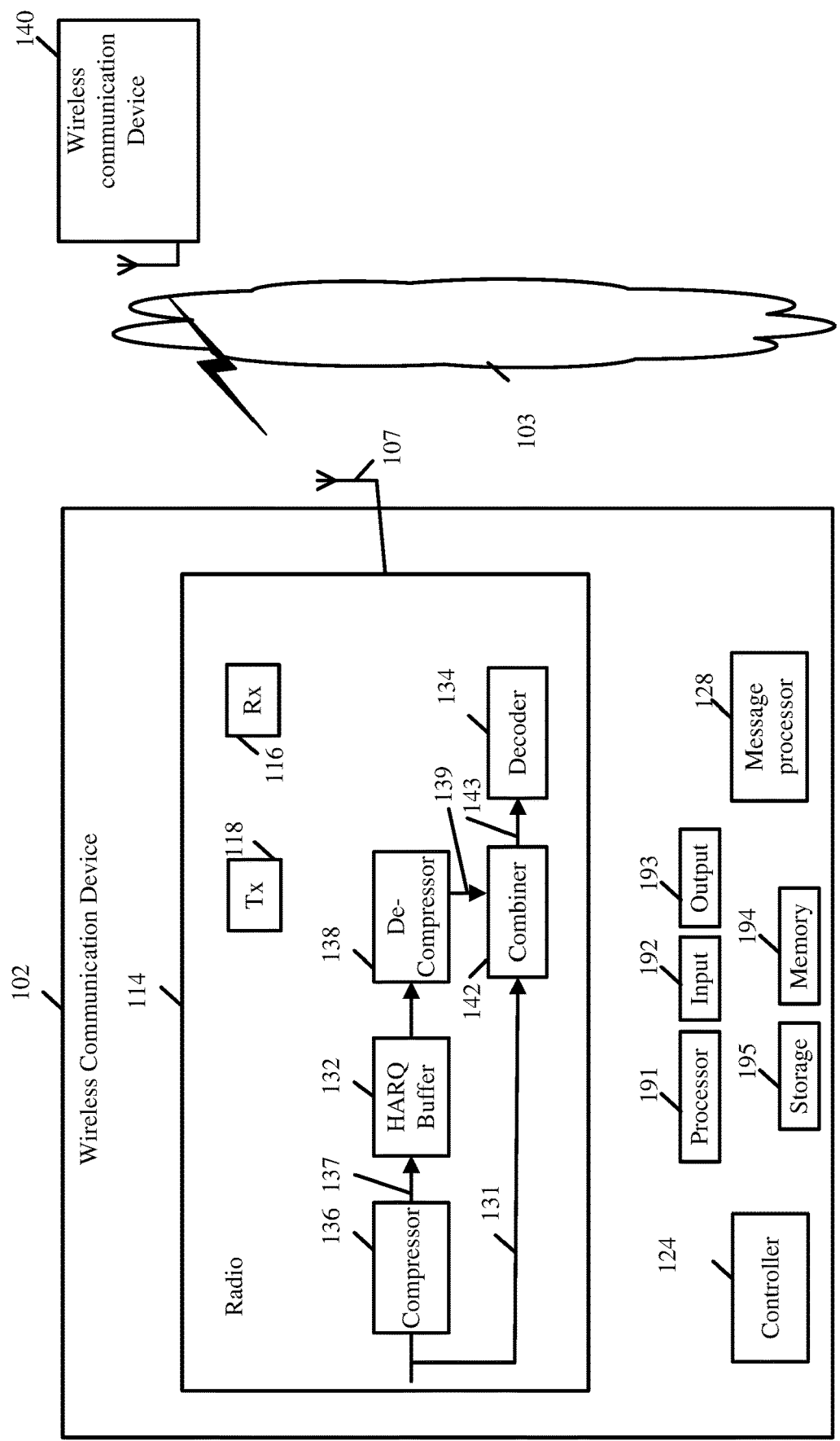
FIG. 1 is a schematic block diagram illustration of a system, in accordance with some exemplary embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (*IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications*, Dec. 7, 2016)), and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), Time-Division Multiplexing (TDM), Time-Division Multiple Access (TDMA), Multi-User MIMO (MU-MIMO), General Packet Radio Service (GPRS), extended GPRS (EGPRS), Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, a 5 GHz band, a 5-7 GHz band, and/or a 6-7 GHz band. However, other embodiments may be implemented utilizing any other suitable wireless communication frequency bands, for example, an unlicensed band, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Some demonstrative embodiments may be implemented for "peer to peer (PTP) communication", which may relate to device-to-device communication over a wireless link ("peer-to-peer link") between devices. The PTP communication may include, for example, a Wi-Fi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (MSS), a Wi-Fi Aware communication, or the like. Other embodiments may be implemented for nay other additional or alternative communication scheme and/or technology.

Reference is now made to FIG. 1, which schematically illustrates a block diagram of a system 100, in accordance with some exemplary embodiments.

As shown in FIG. 1, in some demonstrative embodiments, system 100 may include a wireless communication network including one or more wireless communication devices, e.g., a wireless communication device 102, and/or at least one wireless communication device 140.

In some demonstrative embodiments, wireless communication device 102 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, devices 102 and/or 140 may include a non-AP STA or an access point (AP) STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative embodiments, device 102 and/or device 140 may include, operate as, and/or perform the functionality of, any other devices and/or STAs.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of device 102 may be enclosed in a common housing or packaging, and may be interconnected or operably associated using one or more wired or wireless links. In other embodiments, components of device 102 may be distributed among multiple or separate devices.

In some demonstrative embodiments, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative embodiments, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a Solid State Drive (SSD), a DVD drive, or other suitable removable or non-removable storage units. Memory unit 194 and/or storage unit 195, for example, may store data processed by device 102.

In some demonstrative embodiments, wireless communication device 102 may be capable of communicating content, data, information and/or signals via a wireless medium (WM) 103.

In some demonstrative embodiments, wireless medium 103 may include, for example, a radio channel, a channel, a cellular channel, a Global Navigation Satellite System (GNSS) Channel, an RF channel, a WiFi channel, an IR channel, and the like.

In some demonstrative embodiments, wireless communication medium 103 may include a 2.4 GHz frequency band, and/or one or more other wireless communication frequency bands, for example, a 5 GHz frequency band, a millimeter-Wave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, 140 and/or one or more other devices. For example, device 102 may include at least one radio 114.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative embodiments, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative embodiments, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative embodiments, radio 114 may be configured to communicate over a 2.4 GHz band and/or any other band.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, device 102 may include a controller 124 configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In some demonstrative embodiments, at least part of the functionality of controller 124 may be implemented as part of one or more elements of radio 114.

In other embodiments, the functionality of controller 124 may be implemented as part of any other element of device 102.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative embodiments, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128, respectively. Additionally or alternatively, one or more functionalities of message processor 128 may be implemented by logic, which may be executed by a machine and/or one or more processors, e.g., as described below.

In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include, operate as, perform the role of, and/or perform one or more functionalities of, one or more STAs.

In some demonstrative embodiments, device 102 and/or device 140 may form, or may communicate as part of, a wireless local area network (WLAN).

In some demonstrative embodiments, device 102 and/or device 140 may form, or may communicate as part of, a WiFi network.

In other embodiments, device 102 and/or device 140 may form, and/or communicate as part of, any other additional or alternative network.

In some demonstrative embodiments, device 102 may be configured to support wireless communication with device 140 according to a Hybrid Automatic Repeat Request (HARQ) scheme, e.g., as describe below. For example, device may be configured to process received transmissions from device 140 according to the HARQ scheme, e.g., as described below.

In some demonstrative embodiments, HARQ may be implemented as a Hybrid MAC/PHY capability, which may significantly improve communication link efficiency, for example, in dynamic conditions.

In some demonstrative embodiments, HARQ may provide increased value, for example, when implemented in wireless communication systems, for example, to provide resiliency to dynamic channel conditions.

In some demonstrative embodiments, the HARQ operation may tie retransmissions to PHY Forward Error Correction (FEC) blocks, where a receiver device, e.g., device 102, may store FEC decoder inputs for failed FEC blocks, and may combine the FEC decoder inputs for the failed FEC blocks with related retransmission inputs, e.g., as described below.

In some demonstrative embodiments, device 102 may be configured to store in a HARQ buffer the decoder inputs for failed FEC blocks, e.g., corresponding to unsuccessfully decoded transmissions from device 140, e.g., as described below.

In some demonstrative embodiments, it may be beneficial and/or advantageous to reduce the size of the HARQ buffer, for example, in order to reduce cost.

In some demonstrative embodiments, implementing a fixed compression scheme to reduce the size of a HARQ buffer, may have one or more technical inefficiencies, disadvantages and/or technical problems in one or more use cases and/or scenarios, e.g., as described below.

In one example, a HARQ buffer size may be reduced, for example, by applying a fixed, preconfigured, unified, compression and expansion for all Log Likelihood Ratio (LLR) values of all buffered bits. For example, the fixed compression scheme may include buffering the LLR values using a fixed manner of converting the received LLR values to stored values, and expanding the stored values using a fixed manner of converting the stored LLR values to values to be combined with a new transmission.

According to this example, applying the fixed compression and expansion may result with sub-optimal compression for the LLRs, which may force a larger buffer than minimal for a same performance; and/or may degrade performance to a level lower than a performance level achievable for a same buffer size.

In some demonstrative embodiments, there may be different distribution of LLR values of different soft bits, for example, in different modulation schemes, e.g., as described below. Therefore, maintaining a same fixed compression for all LLR values may result with extended loss and/or degraded performance.

In some demonstrative embodiments, device 102 may be configured according to an LLR compression scheme, which may support a reduced, e.g., minimal, HARQ buffer size, for example, with a reduced, e.g., minimal, impact on efficiency and/or performance of a wireless communication link, e.g., as described below.

In some demonstrative embodiments, device 102 may be configured to support a HARQ scheme, which may support optimizing a tradeoff between a buffer cost and network performance. In one example, the HARQ scheme may be implemented to reduce the size of the HARQ buffer, for example, by a factor of four, or any other factor, which may support reducing cost, while constraining a network throughput loss to up to 2.5%, or any other suitable throughput loss, from this cost reduction, which may improve a value proposition of the device, e.g., as described below.

In some demonstrative embodiments, device 102 may include a HARQ buffer 132 configured to buffer compressed Log Likelihood Ratio (LLR) values 137 corresponding to an unsuccessfully-decoded transmission of a data block, for example, received from device 140, e.g., as described below.

In some demonstrative embodiments, for example, an unsuccessfully-decoded transmission of a data block may include, for example, a received transmission of a data block, which is received by a device, e.g., device 102, and for which the device determines that a decoding of the data block fails, is incorrect and/or is erroneous, for example, since the received transmission of the data block is corrupted in a way which does not allow to properly decode the data block.

For example, device 102 may be configured to implement one or more suitable error detection and/or error correction codes to determine whether the decoding of the transmission of the data block is successful or unsuccessful. In one example, device 102 may be configured to determine whether a decoding of the transmission of a data block is successful or unsuccessful based, for example, on error detection (ED) and/or FEC information corresponding to the received transmission of the data block, e.g., which may be received from a transmitter of the data block.

In some demonstrative embodiments, a bit size of the HARQ buffer 132 may be equal to or less than 3 times a supported HARQ receive (Rx)size. The HARQ Rx size may include a value which may be reported to a transmitter of the data block, for example, device 140, e.g., as described below.

In some demonstrative embodiments, the bit size of the HARQ buffer 132 may be equal to or less than 2.5 times a supported HARQ Rx size, e.g., as described below.

In some demonstrative embodiments, the bit size of the HARQ buffer 132 may be equal to or less than 2 times the supported HARQ Rx size, e.g., as described below.

In other embodiments, the HARQ buffer 132 may have any other bit size, and/or HARQ buffer 132 may be configured to support any other ratio between the bit-size of HARQ buffer 132 and the supported HARQ Rx size.

In some demonstrative embodiments, the supported HARQ Rx size may include a count of LLR values supported for buffering by the HARQ buffer 132, for example, according to the HARQ scheme, e.g., as described below.

In some demonstrative embodiments, a HARQ buffer size for supporting the reported HARQ Rx size without LLR compression may be based on the reported HARQ Rx size and a bit-size of the LLR values. For example, a reported HARQ Rx size of A may require a HARQ buffer with a bit size of A*B, for example, to store LLR values with a bit-size of B bits without LLR compression.

In some demonstrative embodiments, device 102 may include a decoder 134 configured to decode a retransmission of the data block according to the HARQ scheme, for example, based on combined LLR values 143, which are based on the compressed LLR values 137 and based on LLR values 131 corresponding the retransmission of the data block, e.g., as described below.

In some demonstrative embodiments, a compressed LLR value 137 of the plurality of compressed LLR values 137 may represent an LLR value corresponding to a soft bit of the unsuccessfully-decoded transmission of the data block, e.g., as described below.

In some demonstrative embodiments, the LLR value may have a bit size of at least 6 bits.

In some demonstrative embodiments, the LLR value may have a bit size of at least 8 bits.

In other embodiments, the LLR value may have any other bit size.

In some demonstrative embodiments, device 102 may be configured to generate the compressed LLR values according to a compression scheme, which may be configured to support a reduced size of HARQ buffer 132, while also supporting a suitable HARQ gain of decoder 134, e.g., as described below.

In some demonstrative embodiments, a HARQ gain of decoder 134, for example, when decoding the retransmission of the data block based on the combined LLR values 143, e.g., using the plurality of compressed LLR values 137, may be at least 2 Decibel (dB), for example, at least for an Additive White Gaussian Noise (AWGN) channel, e.g., as described below.

In some demonstrative embodiments, the HARQ gain may include a gain of a first decoding error probability relative to a second decoding error probability, e.g., as describe below.

In some demonstrative embodiments, the first decoding error probability may include a decoding error probability of decoder 134 decoding the retransmission of the data block based on the combined LLR values 143, and the second decoding error probability may include a decoding error probability of decoder 134 decoding the data block without retransmission, e.g., as described below.

In some demonstrative embodiments, the HARQ gain of decoding the retransmission of the data block based on the combined LLR values 143 may be at least 2 dB, for example, at least for the AWGN channel and for any supported Modulation and Coding Scheme (MCS), which may be supported by device 102, for the retransmission of the data block, e.g., as described below.

In some demonstrative embodiments, device 102 may include an LLR compressor 136 to generate the compressed LLR values 137, for example, by compressing LLR values, e.g., LLR values 131, corresponding to the unsuccessfully-decoded transmission of a data block according to an LLR compression scheme, e.g., as described below.

In some demonstrative embodiments, device 102 may include an LLR de-compressor 138 to decompress the compressed LLR values 137 into de-compressed LLR values 139, for example, according to the LLR compression scheme, e.g., as described below.

In some demonstrative embodiments, device 102 may include an LLR combiner 142 to generate the combined LLR values 143, for example, by combining the de-compressed LLR values 139 and the LLR values 131 corresponding the retransmission of the data block, e.g., as described below.

In some demonstrative embodiments, LLR compressor 136 may be configured to generate the compressed LLR values 137, for example, based at least on a modulation scheme of the unsuccessfully-decoded transmission of a data block, e.g., as described below.

In some demonstrative embodiments, LLR compressor 136 may be configured to generate a compressed LLR value 137, for example, by compressing an LLR value 131 corresponding to a soft bit of the unsuccessfully-decoded transmission of the data block, e.g., as described below.

In some demonstrative embodiments, LLR compressor 136 may be configured to generate the compressed LLR value 137, for example, based on a bit-index of the soft bit, e.g., as described below.

In other embodiments, LLR compressor 136 may be configured to generate the compressed LLR value 137, for example, based on one or more other additional or alternative mapping scheme and/or algorithm, e.g., as described below.

In some demonstrative embodiments, LLR compressor 136 may be configured to determine a selected mapping function from a plurality of predefined mapping functions, for example, based at least on the bit-index of the soft bit, and to retrieve the compressed LLR value from the selected mapping function, for example, based on the LLR value corresponding to the soft bit, e.g., as described below.

In some demonstrative embodiments, the plurality of mapping functions may be implemented at least partially, for example, using one or more Lookup Table (LUTs). For example, LLR compressor 136 may be configured to determine a selected Lookup Table (LUT) from a plurality of predefined LUTs, for example, based at least on the bit-index of the soft bit, and to retrieve the compressed LLR value from the selected LUT, for example, based on the LLR value corresponding to the soft bit, e.g., as described below.

In other embodiments, the LLR compressor 136 may be configured to determine the selected mapping function and/or LUT, for example, based on any other mapping scheme and/or algorithm.

In some demonstrative embodiments, device 102 may be configured to support optimization of buffering of an LLR value, e.g., even each LLR value, in HARQ buffer 132, for example, based on a location of a soft bit corresponding to the LLR value in a modulation scheme, e.g., that was used to transmit it.

In one example, an optimized format may be different for each soft bit index, for example, if a distribution of LLRs of each soft bit index are different, e.g., as described below.

Figure 2:
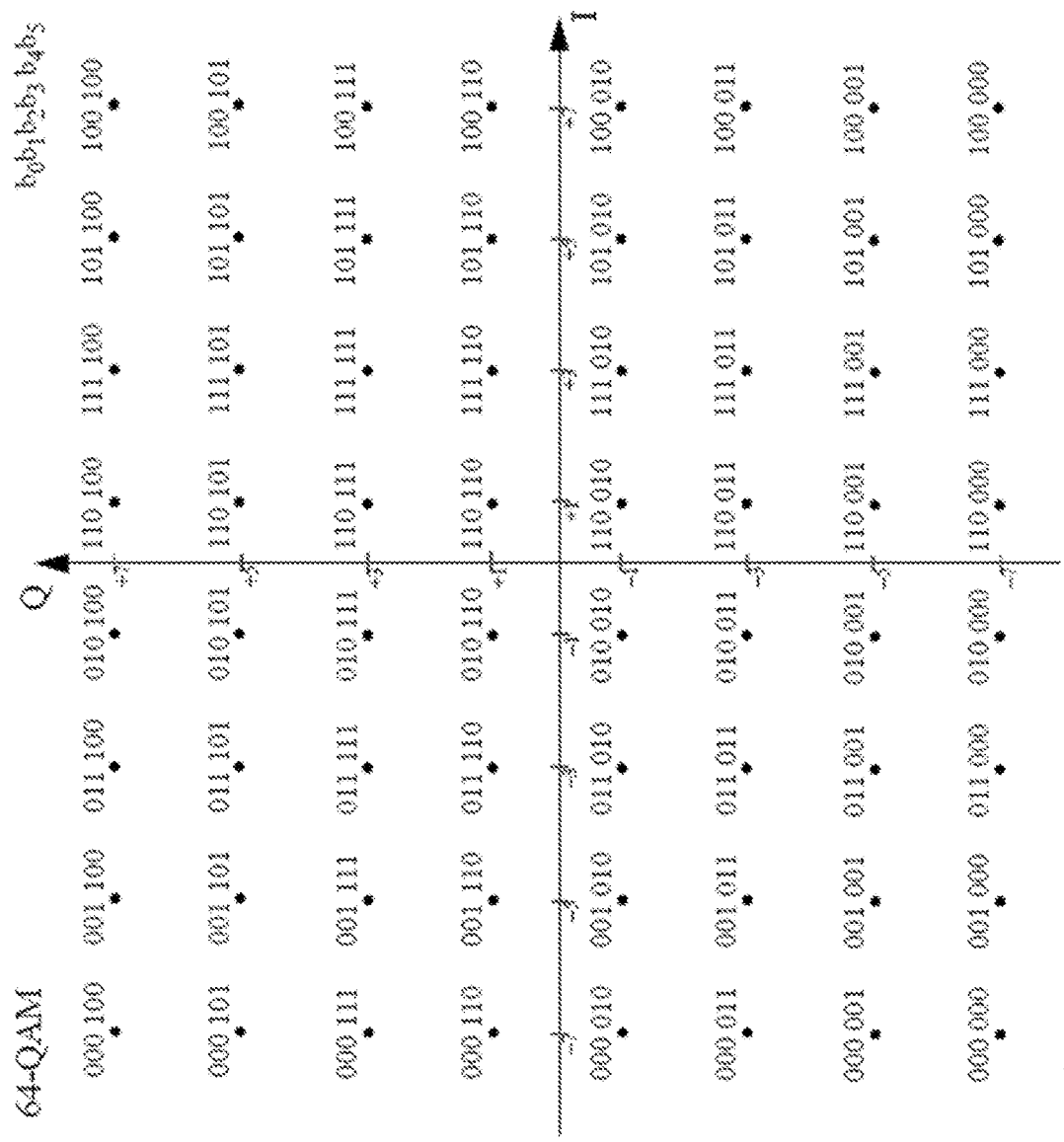
FIG. 2 is a schematic block diagram illustration of a modulation scheme, which may be implemented in accordance with some exemplary embodiments.

Reference is made to FIG. 2, which schematically illustrates a modulation scheme 200, which may be implemented in accordance with some exemplary embodiments.

As shown in FIG. 2, modulation scheme 200 may include a 64 Quadrature amplitude modulation (64-QAM) constellation bit encoding.

In some demonstrative embodiments, as shown in FIG. 2, modulation scheme 200 may include a plurality of constellation points, wherein each point may be represented by 6-bit coding.

In one example, LLR compressor 136 (FIG. 1) may generate the compressed LLR values 137 (FIG. 1), for example, based on LLR values corresponding to soft bit values according to modulation scheme 200, e.g., as described below.

Figure 3:
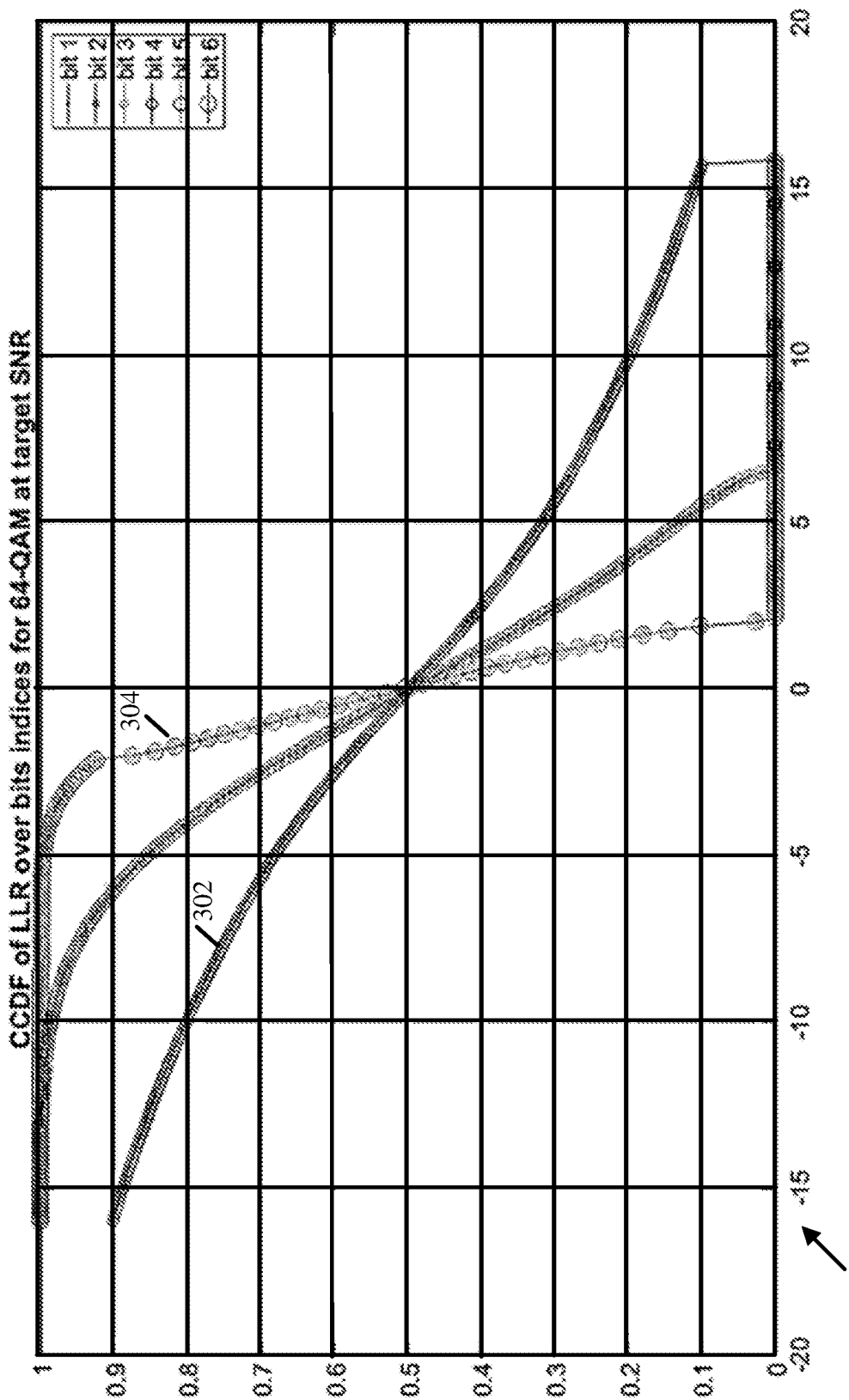
FIG. 3 is a schematic illustration of a graph depicting distributions of Log Likelihood Ratio (LLR) values per bit index of a soft bit, in accordance with some exemplary embodiments.

Reference is made to FIG. 3, which schematically illustrates a graph 300 depicting distributions of LLR values per bit index, in accordance with some exemplary embodiments.

In one example, the bit indexes may correspond to bit indexes of the plurality of constellation points of FIG. 2.

For example, graph 300 depicts a respective complementary cumulative distribution function of LLR values per bit index in the 64-QAM modulation scheme of FIG. 2, for example, for an AWGN channel at a signal to noise ratio of 16.1 dB.

In some demonstrative embodiments, as shown in FIG. 3, a distribution 302 of LLR values of a Most Significant Bit (MSB) of the constellation points of FIG. 2, maybe different from a distribution 304 of LLR values of a Least Significant Bit (LSB) of the constellation points of FIG. 2.

In one example, as shown in graph 300, the distribution 302 may provide more confidence when compressing the LLR values, for example, compared to compression of the LLR values according to distribution 304.

For example, mapping to a same compressed LLR value all LLR values of distribution 302 in a wide range, e.g., between −150 and −50, may allow decompressing the compressed LLR value with an increased level of confidence, while mapping to a same compressed LLR value all LLR values of distribution 304 even in a narrower range, e.g., between −25 and +25, may not allow decompressing the compressed LLR value with an increased level of confidence.

In some demonstrative embodiments, there may be a technical advantage in applying different LLR compressions to the LLR values corresponding to different bit-indexes, for example, the LLR values of distributions 302 and 304, e.g., as described below.

Referring back to FIG. 1, in some demonstrative embodiments, LLR compressor 136 may be configured to generate a compressed LLR value 137 corresponding to an LLR value 131, for example, based on a predefined LLR mapping corresponding to the bit-index of the soft value to which the LLR value 131 corresponds, e.g., as described below.

In some demonstrative embodiments, the LLR mapping may map a plurality of possible LLR values, for example, to one or more possible compressed LLR values, e.g., as described below.

In some demonstrative embodiments, a count of possible compressed LLR values for a compressed LLR value 137 may be based on a bit-size of the compressed LLR value 137. In one example, there may be four possible compressed LLR values, for example, if the compressed LLR value 137 has a bit-size of two bits. In another example, there may be eight possible compressed LLR values, for example, if the compressed LLR value 137 has a bit-size of three bits In some demonstrative embodiments, the LLR mapping may map a plurality of possible LLR value ranges to a respective plurality of possible compressed LLR values, e.g., as described below.

In some demonstrative embodiments, a count of possible LLR value ranges for compressing an LLR value 131 may be based on the count of the possible compressed LLR values for the compressed LLR value 137. In one example, there may be four possible LLR value ranges for compressing an LLR value 131, for example, if the compressed LLR value 137 has a bit-size of two bits. In another example, there may be eight possible LLR value ranges for compressing an LLR value 131, for example, if the compressed LLR value 137 has a bit-size of three bits.

In some demonstrative embodiments, a range of possible LLR values, e.g., between −150 and +150 according to the LLR distribution of FIG. 3, may be divided into a plurality of possible LLR value ranges, which may be mapped to the plurality of possible LLR value ranges.

In one example, two or more, e.g., all, of the plurality of possible LLR value ranges may have a same size.

In one example, two or more ranges, of the plurality of possible LLR value ranges may have different sizes.

In some demonstrative embodiments, the plurality of possible LLR value ranges for compressing an LLR value 131 may be based, for example, on the bit-index of the soft-bit corresponding the to LLR value 131 to be compressed, e.g., as described below.

In some demonstrative embodiments, the plurality of possible LLR value ranges for compressing an LLR value 131 may be based, for example, on the distribution of LLR values corresponding to the bit-index of the soft-bit corresponding the to LLR value 131 to be compressed, e.g., according to the distribution of FIG. 3.

In some demonstrative embodiments, for example, a first plurality of possible LLR value ranges may be defined for compressing an LLR value 131 corresponding to the MSB bit index, for example, based on the distribution of LLR values 302 (FIG. 3) corresponding to the MSB bit-index; and/or a second plurality of possible LLR value ranges may be defined for compressing an LLR value 131 corresponding to the LSB bit index, for example, based on the distribution of LLR values 304 (FIG. 3) corresponding to the LSB bit-index.

In some demonstrative embodiments, the first plurality of possible LLR value ranges for compressing an LLR value 131 corresponding to the MSB bit index may be different from the second plurality of possible LLR value ranges for compressing an LLR value 131 corresponding to the LSB bit index.

In some demonstrative embodiments, for example, a width of ranges in the first plurality of possible LLR value ranges may be different from a width of the second plurality of possible LLR value ranges.

In some demonstrative embodiments, for example, boundaries, e.g., a beginning point and/or an end point, of ranges in the first plurality of possible LLR value ranges may be different from boundaries of the second plurality of possible LLR value ranges.

In one example, the first plurality of possible LLR value ranges for compressing an LLR value 131 corresponding to the MSB bit index may be defined based on the LLR distribution 302 (FIG. 3) to include relatively wide ranges to divide the range of LLR values between −150 and +150.

In another example, the second plurality of possible LLR value ranges for compressing an LLR value 131 corresponding to the LSB bit index may be defined based on the LLR distribution 304 (FIG. 3) to include relatively narrow ranges to divide the range of LLR values between −50 and +50.

In other embodiments, any other definition of the possible LLR value ranges may be implemented.

In some demonstrative embodiments, a count of the one or more possible compressed LLR values for compressing an LLR value 131 may be based, for example, on the bit-index of the soft bit corresponding to the LLR value 131 to be compressed, e.g., as described below.

In some demonstrative embodiments, for a first bit index there may be a first count of possible compressed LLR values, and for a second bit index there may be a second count possible compressed LLR values.

In one example, the first count of possible compressed LLR values may be different from the second count of possible compressed LLR values. For example, an LLR value 131 corresponding to the first bit-index may be compressed using two possible compressed LLR values, e.g., corresponding to a compressed LLR bit-size of one bit; an LLR value 131 corresponding to the second bit-index may be compressed using four possible compressed LLR values, e.g., corresponding to a compressed LLR bit-size of two bits; and/or an LLR value 131 corresponding to a third bit-index may be compressed using eight possible compressed LLR values, e.g., corresponding to a compressed LLR bit-size of three bits.

In one example, the first count of possible compressed LLR values may be equal to the second count of possible compressed LLR values. For example, an LLR value 131 corresponding to the first bit-index may be compressed using four possible compressed LLR values, e.g., corresponding to a compressed LLR bit-size of two bits; and an LLR value 131 corresponding to the second bit-index may be compressed using four possible compressed LLR values, e.g., corresponding to a compressed LLR bit-size of two bits.

In some demonstrative embodiments, LLR compressor 136 may be configured to generate the compressed LLR values 137, for example, based on one or more other additional or alternative parameters and/or criteria, e.g., as described below.

In some demonstrative embodiments, LLR compressor 136 may be configured to generate the compressed LLR values 137, for example, based on a Signal to Noise Ratio (SNR) corresponding to the unsuccessfully-decoded transmission of the data block, e.g., as described below.

In some demonstrative embodiments, LLR compressor 136 may be configured to generate the compressed LLR values 137, for example, based on a retransmission number of the unsuccessfully-decoded transmission of the data block, e.g., as described below.

In some demonstrative embodiments, LLR compressor 136 may be configured to generate a first compressed LLR value corresponding to the soft bit value based on the predefined LLR mapping corresponding to the bit-index, for example, for a first retransmission of the data block, e.g., as described below.

In some demonstrative embodiments, LLR compressor 136 may be configured to generate a subsequent compressed LLR value based on another LLR mapping, which is independent of the bit-index, for example, for a subsequent retransmission of the data block, which is subsequent to the first retransmission, e.g., as described below.

In some demonstrative embodiments, LLR compressor 136 may be configured to generate the compressed LLR values 137, for example, based on any other additional or alternative mapping and/or compression schemes, parameters and/or criteria.

Figure 4:
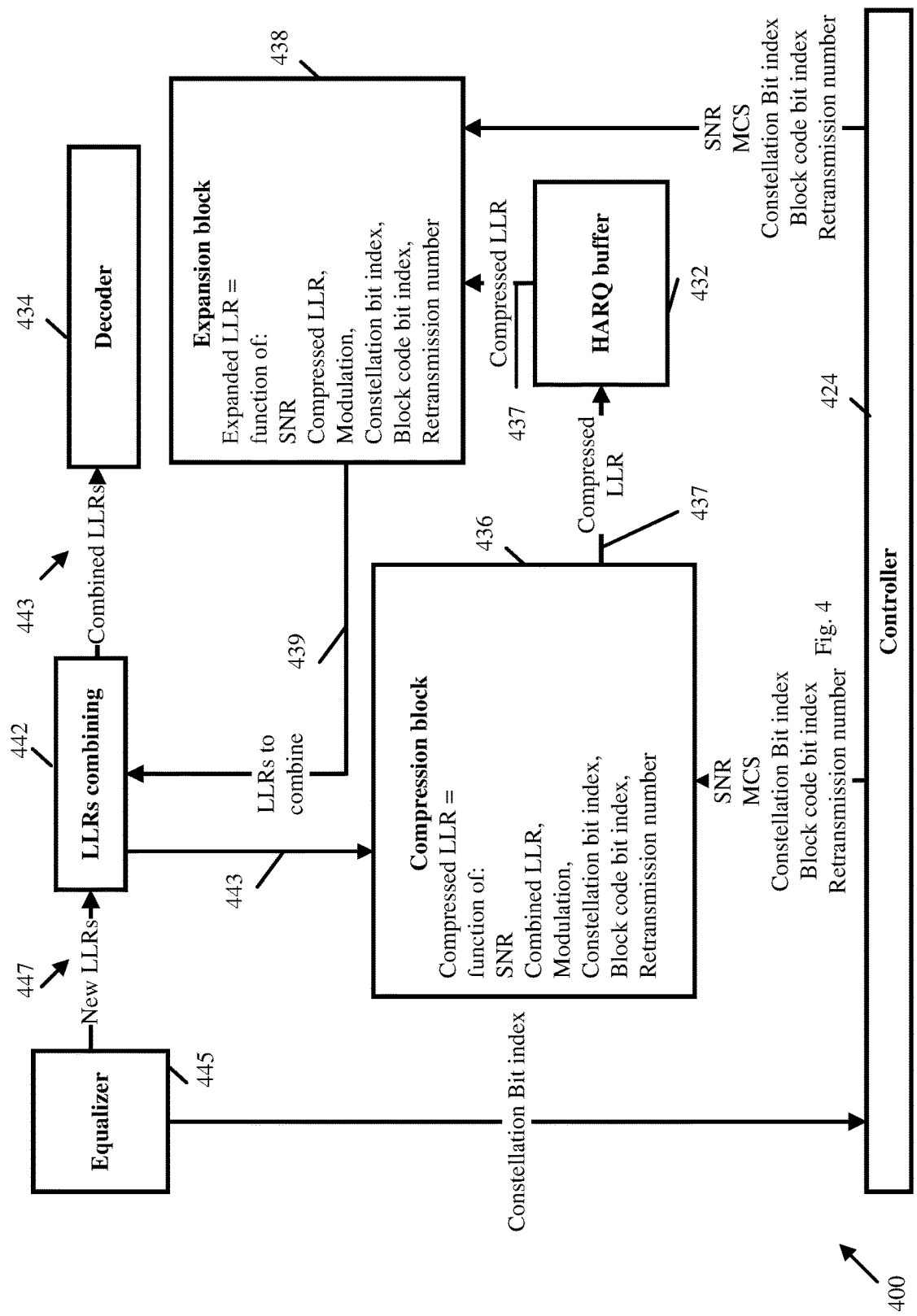
FIG. 4 is a schematic illustration of a Hybrid Automatic Repeat Request (HARQ) scheme, in accordance with some exemplary embodiments.

Reference is made to FIG. 4, which schematically illustrates a HARQ scheme 400, in accordance with some exemplary embodiments.

In some demonstrative embodiments, as shown in FIG. 4, HARQ scheme 400 may include a compression block 436, a HARQ buffer 432, and an expansion block 438. For example, LLR compressor 136 (FIG. 1) may include, perform the functionality of, and/or perform one or more operations of, compression block 436; HARQ buffer 132 (FIG. 1) may include, perform the functionality of, and/or perform one or more operations of, HARQ buffer 432; and/or LLR de-compressor 138 (FIG. 1) may include, perform the functionality of, and/or perform one or more operations of, expansion block 438.

In some demonstrative embodiments, as shown in FIG. 4, compression block 436 may generate compressed LLR values 437 to be stored in HARQ buffer 432.

In one example, HARQ buffer 432 may store the compressed LLR values 437 for being read when their respective code block is being received, and using their values may improve reception performance.

In some demonstrative embodiments, as shown in FIG. 4, compression block 436 may generate the compressed LLR values 437 based on LLR values 431 corresponding to an unsuccessfully-decoded transmission of a data block, e.g., as described below.

In some demonstrative embodiments, as shown in FIG. 4, expansion block 438 may decompress the compressed LLR values 437 into de-compressed LLR values 439.

In one example, LLR expansion block 438 may be configured to expand the LLR values 437, which may be stored in the HARQ buffer 432, to a format to be used by a decoder 434. The expansion implemented by LLR expansion block 438 may be based, for example, on one or more, e.g., all, of the properties used for the compression of LLR values 437, e.g., by compression block 436.

In some demonstrative embodiments, information corresponding to the compression of the LLR values, e.g., the SNR information, MCS information, constellation bit index information, block code bit index information, and/or retransmission number information and/or any other type of information may be provided to LLR expansion block 438, for example, from controller 424. For example, at least part of the information corresponding to the compression of the LLR values may be stored in the HARQ buffer 432.

In some demonstrative embodiments, as shown in FIG. 4, an LLR combiner 442 may generate combined LLR values 443, for example, by combining the de-compressed LLR values 439 and LLR values 447 corresponding to a retransmission of the data block. For example, LLR combiner 142 (FIG. 1) may include, perform the functionality of, and/or perform one or more operations of, LLR combiner 442.

In some demonstrative embodiments, as shown in FIG. 4, decoder 434 may be configured to decode a retransmission of the data block, for example, based on combined LLR values 443, which are based on the compressed LLR values 437, and on LLR values 447 corresponding to the retransmission of the data block. For example, decoder 134 (FIG. 1) may include, perform the functionality of, and/or perform one or more operations of, decoder 434.

In some demonstrative embodiments, as shown in FIG. 4, an equalizer 445 may be configured to provide the LLR values 447 corresponding to the retransmission of the data block, and/or the LLR values 431 corresponding to the unsuccessfully-decoded transmission.

In some demonstrative embodiments, as shown in FIG. 4, a controller 424 may be configured to control operation of one or more elements and/or components of HARQ scheme 400. For example, controller 124 (FIG. 1) may include, perform the functionality of, and/or perform one or more operations of, controller 424.

In some demonstrative embodiments, LLR compression block 436 may be configured to compress LLRs, e.g., LLR values 431, for example, into an efficient format to be stored in the HARQ buffer 432, e.g., as described below.

In some demonstrative embodiments, LLR compression block 436 may compress the LLRs, e.g., LLR values 431, for example, based on a modulation/constellation over which an LLR was transmitted, e.g., as described above.

In some demonstrative embodiments, LLR compression block 436 may compress the LLRs, e.g., LLR values 431, for example, based on a bit index in the constellation represented by the LLR, e.g., as described above.

In some demonstrative embodiments, LLR compression block 436 may compress the LLRs, e.g., LLR values 431, for example, based on an SNR criterion, for example, based on an effective average accumulated SNR over the block code at the first transmission or over an entire set of previous transmissions. Any other SNR criterion and/or measurement may be implemented.

In some demonstrative embodiments, LLR compression block 436 may compress the LLRs, e.g., LLR values 431, for example, based on a number of a retransmission corresponding tot eh LLR values.

In some demonstrative embodiments, LLR compression block 436 may be configured to perform compression of the LLR values 431 according to the compression schemes described above, e.g., based at least on the bit-index, for example, for at least a first transmission. For example, LLR compression block 436 may be configured to perform compression of the LLR values 431 according to a fixed or unified compression, which may be applied for all LLRs, for example, from a second transmission. For example, such a mechanism may help to increase simplification, for example, when bit indices in the block code may be conveyed over different constellation bit indices in each transmission.

In some demonstrative embodiments, LLR compression block 436 may be configured to perform compression of the LLR values 431 according to the compression schemes described above, e.g., based at least on the bit-index, for example, for all transmissions.

For example, a "bit index" of an LLR "n" from two different FEC block transmissions may be different, and information, e.g., a minimal amount of date, which may be used to calculate the bit index may be stored in HARQ buffer 432, for example, instead of saving the bit index for each and every LLR.

In one example, compression block 436 may be configured to store management information in HARQ buffer 432, e.g., in the form of a "sufficient information set", which may precede an LLR-set, e.g., of each FEC block. For example, the management information may include, some or all of the following parameters:

A Block size
A Modulation
A Bit index of first LLR in block
Descriptor information
SNR information
MCS information In another example, each LLR value may be mapped to a "compression function" ID, which may allow to support saving compressed LLRs for the original transmission, as well as for blocks that need more than a single retransmission.

For example, compression block 436 and expansion block 438 may be configured to utilize a set of LLR Compression functions. An LLR compression function may "point" to the bit index of the retransmitted LLR, and to the function following it, for example, in the sense that for compression it is applicable to the saved LLR, or not applicable for a new transmission.

In some demonstrative embodiments, compression block 436 may be configured to compress the LLR values 431 according to an LLR compression scheme, e.g., as described above, which may allow utilizing a reduced average amount of bits in HARQ buffer 432 per soft bit.

For example, the average amount of compressed bits per soft bit may be based on a ratio between a size of HARQ buffer 4232 and an estimated count of soft bits.

In some demonstrative embodiments, the LLR compression scheme, e.g., as described above, may support utilizing a different average amount of bits per soft bit in HARQ buffer 432, for example, for different modulation coding schemes.

In some demonstrative embodiments, the LLR compression scheme, e.g., as described above, may support an improved HARQ gain, e.g., which may be measured as a combined gain following retransmissions, for example, compared to an expected gain of an LLR compression scheme utilizing fixed quantization for all LLRs, with the average amount of bits per LLR.

In some demonstrative embodiments, a HARQ testing scheme may be implemented to test performance of a device implementing a HARQ scheme, e.g., as described below.

In some demonstrative embodiments, the testing scheme may be configured to determine the HARQ gain of the device implementing the HARQ scheme, e.g., as described below.

In some demonstrative embodiments, the testing scheme may be configured to determine whether or not the HARQ gain of the device implementing the HARQ scheme is greater than 2 dB, e.g., as described below.

In some demonstrative embodiments, the testing scheme may include the following setup and/or operations:

1. Identify a buffer size, which is capable to hold up to 1 or 2 bits per LLR for a HARQ buffer to be reported by a device under test (DUT);
2. Configure an MCS of the received signal, e.g., defining the 16QAM, 64QAM or QPSK modulation, with an AWGN channel;
3. Force no HARQ retransmissions;
4. Identify a maximal SNR, denoted "Max_SNR_100%_error_rate_1st_Rx", for which 100% of received data units, e.g., code blocks or data packets, fail.
SNR shall be with 0.25 dB resolution;
5. Enable 1 HARQ retransmission;
6. Capture an error rate, denoted "error_rate_at_1st_retransmission_Max_SNR_100%_error_rate_1st_Rx", of the same data units, e.g., the code blocks or the data packets, of a 2nd HARQ transmission, e.g., a first retransmission;
7. Force no HARQ retransmissions;
8. Capture an error rate of the data units at SNR equal to: "Max_SNR_100%_error_rate_1st_Rx"+2 [dB]: "error_rate_at_1st_Rx_Max_SNR_100%_plus_2 dB"
9. Repeat operations 2-8 for all MCSs reported as supported by the DUT
10. The HARQ gain of the DUT may be determined to be greater than 2 dB, for example, if for all MCS, "PER_at_1st_Rx_Max_SNR_100%_plus_2 dB">="PER_at_1st_retransmission_Max_SNR_100%_PER_1st_Rx".

In other embodiments, the test scheme may include only some of the operations described above and/or any other testing scheme may be used to determine the HARQ performance of the device.

Figure 5:
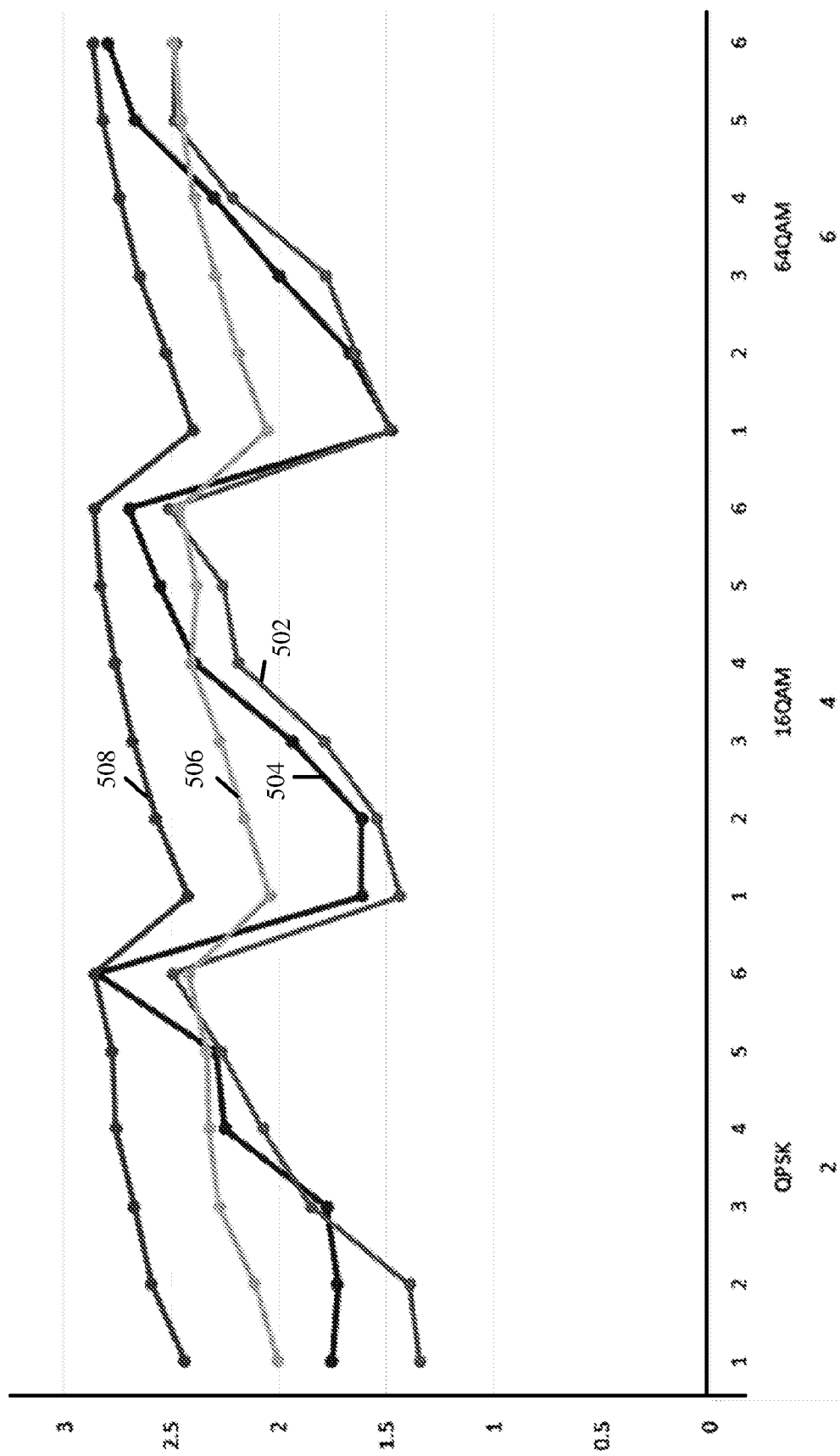
FIG. 5 is a schematic illustration of a graph depicting simulation results of HARQ performance of a HARQ scheme utilizing a HARQ compression scheme, in accordance with some exemplary embodiments.

Reference is made to FIG. 5, which schematically illustrates a graph 500 depicting HARQ performance of a HARQ scheme utilizing a HARQ compression scheme, in accordance with some exemplary embodiments.

For example, curves 502 and 504 depict gain of a fixed bit quantization HARQ scheme.

For example, curves 506 and 508 depict gain of a HARQ scheme utilizing the LLR compression scheme based at least on the bit-index, e.g., as described above.

In some demonstrative embodiments, as shown by curves 502 and 504, when using a fixed number of 3 or less quantization bits, only a reduced gain which is lower than 2 dB may be achieved. As shown by curves 502 and 504, a gain which is higher than 2 dB may be achieved only when using a large number of quantization bits.

In some demonstrative embodiments, as shown in FIG. 5, as shown by curves 506 and 508, an increased gain of at least 2 dB may be achieved by the LLR compression scheme based at least on the bit-index, e.g., as described above, for all of the 16QAM, 64QAM and QPSK modulations, while allowing the use of a reduced HARQ buffer utilizing an average of less than 2.5 bits per LLR value.

Figure 6:
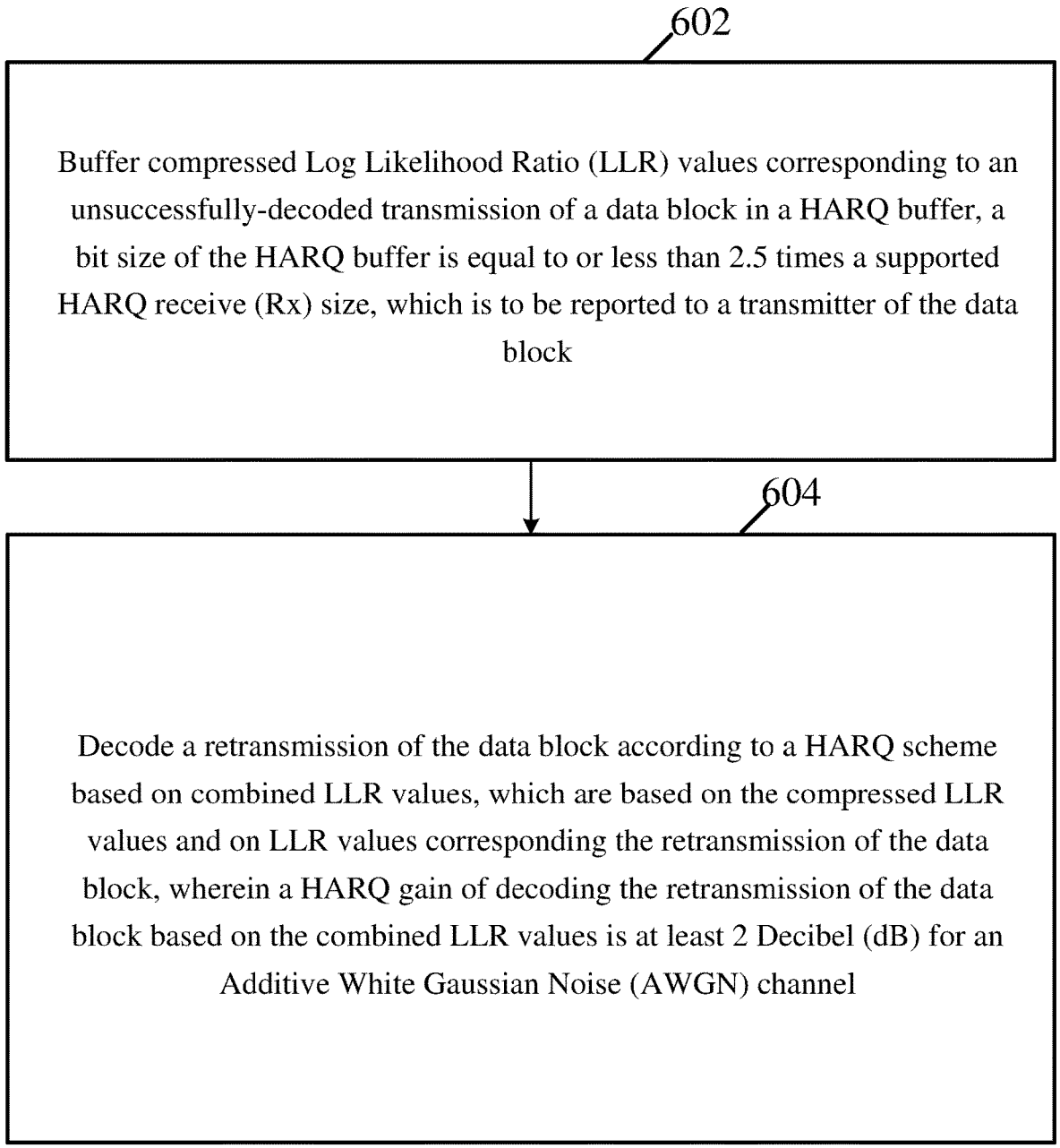
FIG. 6 is a schematic flow-chart illustration of a method of wireless communication according to a HARQ scheme, in accordance with some exemplary embodiments.

Reference is made to FIG. 6, which schematically illustrates a method of wireless communication according to a HARQ scheme, in accordance with some exemplary embodiments. For example, one or more operations of the method of FIG. 6 may be performed by one or more elements of a system, e.g., system 100 (FIG. 1), for example, one or more wireless devices, e.g., device 102 (FIG. 1), a compressor, e.g., compressor 136 (FIG. 1), a HARQ buffer, e.g., HARQ buffer 132 (FIG. 1), a decoder, e.g., decoder 134 (FIG. 1), a controller, e.g., controller 124 (FIG. 1), a radio, e.g., radio 114 (FIG. 1), a receiver, e.g., receiver 116 (FIG. 1), and/or a message processor, e.g., message processor 128 (FIG. 1).

As indicated at block 602, the method may include buffering by a HARQ buffer compressed LLR values corresponding to an unsuccessfully-decoded transmission of a data block, a bit size of the HARQ buffer is equal to or less than 2.5 times a supported HARQ Rx size, which is to be reported to a transmitter of the data block. For example, HARQ buffer 132 (FIG. 1) may buffer the compressed LLR values corresponding to the unsuccessfully-decoded transmission of the data block, and the bit size of the HARQ buffer 132 (FIG. 1) may be equal to or less than 2.5 times the supported HARQ Rx size, which is to be reported to device 140 (FIG. 1), e.g., as described above.

As indicated at block 604, the method may include decoding a retransmission of the data block according to the HARQ scheme based on combined LLR values, which are based on the compressed LLR values and on LLR values corresponding the retransmission of the data block, wherein a HARQ gain of decoding the retransmission of the data block based on the combined LLR values is at least 2 dB, e.g., at least for an AWGN channel. For example, decoder 134 (FIG. 1) may be configured to decode the retransmission of the data block according to the HARQ scheme based on the combined LLR values, which are based on the compressed LLR values and on the LLR values corresponding the retransmission of the data block, and wherein the HARQ gain of decoding the retransmission of the data block based on the combined LLR values is at least 2 dB, e.g., at least for the AWGN channel, e.g., as described above.

Figure 7:
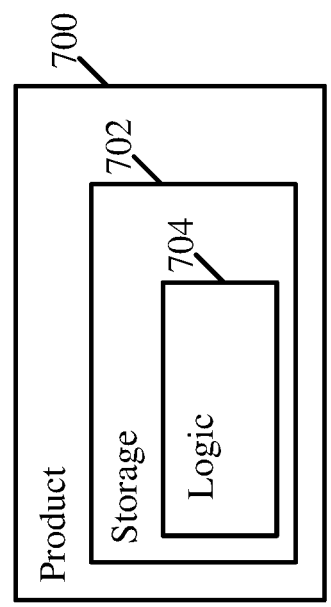
FIG. 7 is a schematic illustration of a product of manufacture, in accordance with some exemplary embodiments.

Reference is made to FIG. 7, which schematically illustrates a product of manufacture 700, in accordance with some exemplary embodiments. Product 700 may include one or more tangible computer-readable ("machine-readable") non-transitory storage media 702, which may include computer-executable instructions, e.g., implemented by logic 704, operable to, when executed by at least one computer processor, enable the at least one computer processor to implement one or more operations at device 102 (FIG. 1), radio 114 (FIG. 1), receiver 116 (FIG. 1), transmitter 118 (FIG. 1), compressor 136 (FIG. 1), de-compressor 138 (FIG. 1), HARQ buffer 132 (FIG. 1), combiner 142 (FIG. 1), decoder 134 (FIG. 1), controller 124 (FIG. 1), and/or message processor 128 (FIG. 1), to cause device 102 (FIG. 1), radio 114 (FIG. 1), receiver 116 (FIG. 1), transmitter 118 (FIG. 1), compressor 136 (FIG. 1), de-compressor 138 (FIG. 1), HARQ buffer 132 (FIG. 1), combiner 142 (FIG. 1), decoder 134 (FIG. 1), controller 124 (FIG. 1), and/or message processor 128 (FIG. 1) to perform, trigger and/or implement one or more operations and/or functionalities, and/or to perform, trigger and/or implement one or more operations and/or functionalities described with reference to the FIGS. 1, 2, 3, 4, 5, and/or 6, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 700 and/or machine-readable storage media 702 may include one or more types of computer-readable storage media capable of storing data, including volatile memory, non-volatile memory, removable or non-removable memory, erasable or non-erasable memory, writeable or re-writeable memory, and the like. For example, machine-readable storage media 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication according to a Hybrid Automatic Repeat Request (HARQ) scheme, the apparatus comprising a HARQ buffer configured to buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and a decoder configured to decode a retransmission of the data block according to the HARQ scheme based on combined LLR values, which are based on the compressed LLR values and on LLR values corresponding the retransmission of the data block, wherein a HARQ gain of decoding the retransmission of the data block based on the combined LLR values is at least 2 Decibel (dB) for an Additive White Gaussian Noise (AWGN) channel.

Example 2 includes the subject matter of Example 1, and optionally, wherein the HARQ gain comprises a gain of a first decoding error probability relative to a second decoding error probability, the first decoding error probability comprising a decoding error probability of decoding the retransmission of the data block based on the combined LLR values, the second decoding error probability comprising a decoding error probability of decoding the data block without retransmission.

Example 3 includes the subject matter of Example 1 or 2, and optionally, wherein the HARQ gain of decoding the retransmission of the data block based on the combined LLR values is at least 2 dB for the AWGN channel and for any supported Modulation and Coding Scheme (MCS) for the retransmission of the data block.

Example 4 includes the subject matter of any one of Examples 1-3, and optionally, wherein the supported HARQ receive (Rx) size comprises a count of LLR values supported for buffering by the HARQ buffer according to the HARQ scheme.

Example 5 includes the subject matter of any one of Examples 1-4, and optionally, comprising an LLR compressor to generate the compressed LLR values by compressing LLR values corresponding to the unsuccessfully-decoded transmission of a data block according to an LLR compression scheme; an LLR de-compressor to decompress the compressed LLR values into de-compressed LLR values according to the LLR compression scheme; and an LLR combiner to generate the combined LLR values by combining the de-compressed LLR values and the LLR values corresponding the retransmission of the data block.

Example 6 includes the subject matter of Example 5, and optionally, wherein the LLR compressor is configured to generate the compressed LLR values based on a modulation scheme of the unsuccessfully-decoded transmission of the data block.

Example 7 includes the subject matter of Example 5 or 6, and optionally, wherein the LLR compressor is configured to generate a compressed LLR value by compressing an LLR value corresponding to a soft bit of the unsuccessfully-decoded transmission of the data block, the LLR compressor is configured to generate the compressed LLR value based on a bit-index of the soft bit.

Example 8 includes the subject matter of Example 7, and optionally, wherein the LLR compressor is configured to generate the compressed LLR value based on a predefined LLR mapping corresponding to the bit-index, the LLR mapping to map a plurality of possible LLR values to one or more possible compressed LLR values.

Example 9 includes the subject matter of Example 8, and optionally, wherein the LLR mapping is to map a plurality of possible LLR value ranges to a respective plurality of possible compressed LLR values.

Example 10 includes the subject matter of Example 9, and optionally, wherein the plurality of possible LLR value ranges are based on the bit-index.

Example 11 includes the subject matter of any one of Examples 8-10, and optionally, wherein a count of the one or more possible compressed LLR values is based on the bit-index.

Example 12 includes the subject matter of any one of Examples 8-11, and optionally, wherein the LLR compressor is configured to for a first retransmission of the data block, generate a first compressed LLR value corresponding to the soft bit value based on the predefined LLR mapping corresponding to the bit-index, and for a subsequent retransmission of the data block, which is subsequent to the first retransmission, generate a subsequent compressed LLR value based on another LLR mapping, which is independent of the bit-index.

Example 13 includes the subject matter of any one of Examples 7-12, and optionally, wherein the LLR compressor is configured to determine a selected mapping function from a plurality of predefined mapping functions based at least on the bit-index of the soft bit, and to retrieve the compressed LLR value from the selected mapping function based on the LLR value corresponding to the soft bit.

Example 14 includes the subject matter of any one of Examples 5-13, and optionally, wherein the LLR compressor is configured to generate the compressed LLR values based on a Signal to Noise Ratio (SNR) corresponding to the unsuccessfully-decoded transmission of the data block.

Example 15 includes the subject matter of any one of Examples 5-14, and optionally, wherein the LLR compressor is configured to generate the compressed LLR values based on a retransmission number of the unsuccessfully-decoded transmission of the data block.

Example 16 includes the subject matter of any one of Examples 1-15, and optionally, wherein the bit size of the HARQ buffer is equal to or less than 2 times the supported HARQ Rx size.

Example 17 includes the subject matter of any one of Examples 1-16, and optionally, wherein a compressed LLR value of the plurality of compressed LLR values is to represent an LLR value corresponding to a soft bit of the unsuccessfully-decoded transmission of the data block, the LLR value having a bit size of at least 6 bits.

Example 18 includes the subject matter of any one of Examples 1-17, and optionally, comprising a radio to receive the transmission of the data block.

Example 19 includes the subject matter of Example 18, and optionally, comprising one or more antennas connected to the radio, a memory, and a processor to execute instructions of an operating system.

Example 20 includes a wireless communication device configured for communication according to a Hybrid Automatic Repeat Request (HARQ) scheme, the wireless communication device comprising a memory to store operations of an operating system of the wireless communication device; a processor to execute the operations of the operating system of the wireless communication device; one or more antennas; a radio connected to the one or more antennas to communicate over a wireless communication medium; a HARQ buffer configured to buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and a decoder configured to decode a retransmission of the data block according to the HARQ scheme based on combined LLR values, which are based on the compressed LLR values and on LLR values corresponding the retransmission of the data block, wherein a HARQ gain of decoding the retransmission of the data block based on the combined LLR values is at least 2 Decibel (dB) for an Additive White Gaussian Noise (AWGN) channel.

Example 21 includes the subject matter of Example 20, and optionally, wherein the HARQ gain comprises a gain of a first decoding error probability relative to a second decoding error probability, the first decoding error probability comprising a decoding error probability of decoding the retransmission of the data block based on the combined LLR values, the second decoding error probability comprising a decoding error probability of decoding the data block without retransmission.

Example 22 includes the subject matter of Example 20 or 21, and optionally, wherein the HARQ gain of decoding the retransmission of the data block based on the combined LLR values is at least 2 dB for the AWGN channel and for any supported Modulation and Coding Scheme (MCS) for the retransmission of the data block.

Example 23 includes the subject matter of any one of Examples 20-22, and optionally, wherein the supported HARQ receive (Rx) size comprises a count of LLR values supported for buffering by the HARQ buffer according to the HARQ scheme.

Example 24 includes the subject matter of any one of Examples 20-23, and optionally, comprising an LLR compressor to generate the compressed LLR values by compressing LLR values corresponding to the unsuccessfully-decoded transmission of a data block according to an LLR compression scheme; an LLR de-compressor to decompress the compressed LLR values into de-compressed LLR values according to the LLR compression scheme; and an LLR combiner to generate the combined LLR values by combining the de-compressed LLR values and the LLR values corresponding the retransmission of the data block.

Example 25 includes the subject matter of Example 24, and optionally, wherein the LLR compressor is configured to generate the compressed LLR values based on a modulation scheme of the unsuccessfully-decoded transmission of the data block.

Example 26 includes the subject matter of Example 24 or 25, and optionally, wherein the LLR compressor is configured to generate a compressed LLR value by compressing an LLR value corresponding to a soft bit of the unsuccessfully-decoded transmission of the data block, the LLR compressor is configured to generate the compressed LLR value based on a bit-index of the soft bit.

Example 27 includes the subject matter of Example 26, and optionally, wherein the LLR compressor is configured to generate the compressed LLR value based on a predefined LLR mapping corresponding to the bit-index, the LLR mapping to map a plurality of possible LLR values to one or more possible compressed LLR values.

Example 28 includes the subject matter of Example 27, and optionally, wherein the LLR mapping is to map a plurality of possible LLR value ranges to a respective plurality of possible compressed LLR values.

Example 29 includes the subject matter of Example 28, and optionally, wherein the plurality of possible LLR value ranges are based on the bit-index.

Example 30 includes the subject matter of any one of Examples 27-29, and optionally, wherein a count of the one or more possible compressed LLR values is based on the bit-index.

Example 31 includes the subject matter of any one of Examples 27-30, and optionally, wherein the LLR compressor is configured to for a first retransmission of the data block, generate a first compressed LLR value corresponding to the soft bit value based on the predefined LLR mapping corresponding to the bit-index, and for a subsequent retransmission of the data block, which is subsequent to the first retransmission, generate a subsequent compressed LLR value based on another LLR mapping, which is independent of the bit-index.

Example 32 includes the subject matter of any one of Examples 26-31, and optionally, wherein the LLR compressor is configured to determine a selected mapping function from a plurality of predefined mapping functions based at least on the bit-index of the soft bit, and to retrieve the compressed LLR value from the selected mapping function based on the LLR value corresponding to the soft bit.

Example 33 includes the subject matter of any one of Examples 24-32, and optionally, wherein the LLR compressor is configured to generate the compressed LLR values based on a Signal to Noise Ratio (SNR) corresponding to the unsuccessfully-decoded transmission of the data block.

Example 34 includes the subject matter of any one of Examples 24-33, and optionally, wherein the LLR compressor is configured to generate the compressed LLR values based on a retransmission number of the unsuccessfully-decoded transmission of the data block.

Example 35 includes the subject matter of any one of Examples 20-34, and optionally, wherein the bit size of the HARQ buffer is equal to or less than 2 times the supported HARQ Rx size.

Example 36 includes the subject matter of any one of Examples 20-35, and optionally, wherein a compressed LLR value of the plurality of compressed LLR values is to represent an LLR value corresponding to a soft bit of the unsuccessfully-decoded transmission of the data block, the LLR value having a bit size of at least 6 bits.

Example 37 includes a method of wireless communication according to a Hybrid Automatic Repeat Request (HARQ) scheme, the method comprising buffering in a HARQ buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and decoding a retransmission of the data block according to the HARQ scheme based on combined LLR values, which are based on the compressed LLR values and on LLR values corresponding the retransmission of the data block, wherein a HARQ gain of decoding the retransmission of the data block based on the combined LLR values is at least 2 Decibel (dB) for an Additive White Gaussian Noise (AWGN) channel.

Example 38 includes the subject matter of Example 37, and optionally, wherein the HARQ gain comprises a gain of a first decoding error probability relative to a second decoding error probability, the first decoding error probability comprising a decoding error probability of decoding the retransmission of the data block based on the combined LLR values, the second decoding error probability comprising a decoding error probability of decoding the data block without retransmission.

Example 39 includes the subject matter of Example 37 or 38, and optionally, wherein the HARQ gain of decoding the retransmission of the data block based on the combined LLR values is at least 2 dB for the AWGN channel and for any supported Modulation and Coding Scheme (MCS) for the retransmission of the data block.

Example 40 includes the subject matter of any one of Examples 37-39, and optionally, wherein the supported HARQ receive (Rx) size comprises a count of LLR values supported for buffering by the HARQ buffer according to the HARQ scheme.

Example 41 includes the subject matter of any one of Examples 37-40, and optionally, comprising generating the compressed LLR values by compressing LLR values corresponding to the unsuccessfully-decoded transmission of a data block according to an LLR compression scheme; decompressing the compressed LLR values into de-compressed LLR values according to the LLR compression scheme; and generating the combined LLR values by combining the de-compressed LLR values and the LLR values corresponding the retransmission of the data block.

Example 42 includes the subject matter of Example 41, and optionally, comprising generating the compressed LLR values based on a modulation scheme of the unsuccessfully-decoded transmission of the data block.

Example 43 includes the subject matter of Example 41 or 42, and optionally, comprising generating a compressed LLR value by compressing an LLR value corresponding to a soft bit of the unsuccessfully-decoded transmission of the data block, wherein generating the compressed LLR value is based on a bit-index of the soft bit.

Example 44 includes the subject matter of Example 43, and optionally, comprising generating the compressed LLR value based on a predefined LLR mapping corresponding to the bit-index, the LLR mapping to map a plurality of possible LLR values to one or more possible compressed LLR values.

Example 45 includes the subject matter of Example 44, and optionally, wherein the LLR mapping is to map a plurality of possible LLR value ranges to a respective plurality of possible compressed LLR values.

Example 46 includes the subject matter of Example 45, and optionally, wherein the plurality of possible LLR value ranges are based on the bit-index.

Example 47 includes the subject matter of any one of Examples 44-46, and optionally, wherein a count of the one or more possible compressed LLR values is based on the bit-index.

Example 48 includes the subject matter of any one of Examples 44-47, and optionally, comprising for a first retransmission of the data block, generating a first compressed LLR value corresponding to the soft bit value based on the predefined LLR mapping corresponding to the bit-index, and for a subsequent retransmission of the data block, which is subsequent to the first retransmission, generating a subsequent compressed LLR value based on another LLR mapping, which is independent of the bit-index.

Example 49 includes the subject matter of any one of Examples 43-48, and optionally, comprising determining a selected mapping function from a plurality of predefined mapping functions based at least on the bit-index of the soft bit, and retrieving the compressed LLR value from the selected mapping function based on the LLR value corresponding to the soft bit.

Example 50 includes the subject matter of any one of Examples 41-49, and optionally, comprising generating the compressed LLR values based on a Signal to Noise Ratio (SNR) corresponding to the unsuccessfully-decoded transmission of the data block.

Example 51 includes the subject matter of any one of Examples 41-50, and optionally, comprising generating the compressed LLR values based on a retransmission number of the unsuccessfully-decoded transmission of the data block.

Example 52 includes the subject matter of any one of Examples 37-51, and optionally, wherein the bit size of the HARQ buffer is equal to or less than 2 times the supported HARQ Rx size.

Example 53 includes the subject matter of any one of Examples 37-52, and optionally, wherein a compressed LLR value of the plurality of compressed LLR values is to represent an LLR value corresponding to a soft bit of the unsuccessfully-decoded transmission of the data block, the LLR value having a bit size of at least 6 bits.

Example 54 includes a product comprising one or more tangible computer-readable non-transitory storage media comprising computer-executable instructions operable to, when executed by at least one processor, enable the at least one processor to cause a wireless communication device to buffer in a Hybrid Automatic Repeat Request (HARQ) buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and decode a retransmission of the data block according to a HARQ scheme based on combined LLR values, which are based on the compressed LLR values and on LLR values corresponding the retransmission of the data block, wherein a HARQ gain of decoding the retransmission of the data block based on the combined LLR values is at least 2 Decibel (dB) for an Additive White Gaussian Noise (AWGN) channel.

Example 55 includes the subject matter of Example 54, and optionally, wherein the HARQ gain comprises a gain of a first decoding error probability relative to a second decoding error probability, the first decoding error probability comprising a decoding error probability of decoding the retransmission of the data block based on the combined LLR values, the second decoding error probability comprising a decoding error probability of decoding the data block without retransmission.

Example 56 includes the subject matter of Example 54 or 55, and optionally, wherein the HARQ gain of decoding the retransmission of the data block based on the combined LLR values is at least 2 dB for the AWGN channel and for any supported Modulation and Coding Scheme (MCS) for the retransmission of the data block.

Example 57 includes the subject matter of any one of Examples 54-56, and optionally, wherein the supported HARQ receive (Rx) size comprises a count of LLR values supported for buffering by the HARQ buffer according to the HARQ scheme.

Example 58 includes the subject matter of any one of Examples 54-57, and optionally, wherein the instructions, when executed, cause the wireless communication device to generate the compressed LLR values by compressing LLR values corresponding to the unsuccessfully-decoded transmission of a data block according to an LLR compression scheme; decompress the compressed LLR values into de-compressed LLR values according to the LLR compression scheme; and generate the combined LLR values by combining the de-compressed LLR values and the LLR values corresponding the retransmission of the data block.

Example 59 includes the subject matter of Example 58, and optionally, wherein the instructions, when executed, cause the wireless communication device to generate the compressed LLR values based on a modulation scheme of the unsuccessfully-decoded transmission of the data block.

Example 60 includes the subject matter of Example 58 or 59, and optionally, wherein the instructions, when executed, cause the wireless communication device to generate a compressed LLR value by compressing an LLR value corresponding to a soft bit of the unsuccessfully-decoded transmission of the data block, wherein generating the compressed LLR value is based on a bit-index of the soft bit.

Example 61 includes the subject matter of Example 60, and optionally, wherein the instructions, when executed, cause the wireless communication device to generate the compressed LLR value based on a predefined LLR mapping corresponding to the bit-index, the LLR mapping to map a plurality of possible LLR values to one or more possible compressed LLR values.

Example 62 includes the subject matter of Example 61, and optionally, wherein the LLR mapping is to map a plurality of possible LLR value ranges to a respective plurality of possible compressed LLR values.

Example 63 includes the subject matter of Example 62, and optionally, wherein the plurality of possible LLR value ranges are based on the bit-index.

Example 64 includes the subject matter of any one of Examples 61-63, and optionally, wherein a count of the one or more possible compressed LLR values is based on the bit-index.

Example 65 includes the subject matter of any one of Examples 61-64, and optionally, wherein the instructions, when executed, cause the wireless communication device to for a first retransmission of the data block, generate a first compressed LLR value corresponding to the soft bit value based on the predefined LLR mapping corresponding to the bit-index, and for a subsequent retransmission of the data block, which is subsequent to the first retransmission, generate a subsequent compressed LLR value based on another LLR mapping, which is independent of the bit-index.

Example 66 includes the subject matter of any one of Examples 60-65, and optionally, wherein the instructions, when executed, cause the wireless communication device to determine a selected mapping function from a plurality of predefined mapping functions based at least on the bit-index of the soft bit, and to retrieve the compressed LLR value from the selected mapping function based on the LLR value corresponding to the soft bit.

Example 67 includes the subject matter of any one of Examples 58-66, and optionally, wherein the instructions, when executed, cause the wireless communication device to generate the compressed LLR values based on a Signal to Noise Ratio (SNR) corresponding to the unsuccessfully-decoded transmission of the data block.

Example 68 includes the subject matter of any one of Examples 58-67, and optionally, wherein the instructions, when executed, cause the wireless communication device to generate the compressed LLR values based on a retransmission number of the unsuccessfully-decoded transmission of the data block.

Example 69 includes the subject matter of any one of Examples 54-68, and optionally, wherein the bit size of the HARQ buffer is equal to or less than 2 times the supported HARQ Rx size.

Example 70 includes the subject matter of any one of Examples 54-69, and optionally, wherein a compressed LLR value of the plurality of compressed LLR values is to represent an LLR value corresponding to a soft bit of the unsuccessfully-decoded transmission of the data block, the LLR value having a bit size of at least 6 bits.

Example 71 includes an apparatus for wireless communication according to a Hybrid Automatic Repeat Request (HARQ) scheme, the apparatus comprising means for buffering in a HARQ buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and means for decoding a retransmission of the data block according to the HARQ scheme based on combined LLR values, which are based on the compressed LLR values and on LLR values corresponding the retransmission of the data block, wherein a HARQ gain of decoding the retransmission of the data block based on the combined LLR values is at least 2 Decibel (dB) for an Additive White Gaussian Noise (AWGN) channel.

Example 72 includes the subject matter of Example 71, and optionally, wherein the HARQ gain comprises a gain of a first decoding error probability relative to a second decoding error probability, the first decoding error probability comprising a decoding error probability of decoding the retransmission of the data block based on the combined LLR values, the second decoding error probability comprising a decoding error probability of decoding the data block without retransmission.

Example 73 includes the subject matter of Example 71 or 72, and optionally, wherein the HARQ gain of decoding the retransmission of the data block based on the combined LLR values is at least 2 dB for the AWGN channel and for any supported Modulation and Coding Scheme (MC S) for the retransmission of the data block.

Example 74 includes the subject matter of any one of Examples 71-73, and optionally, wherein the supported HARQ receive (Rx) size comprises a count of LLR values supported for buffering by the HARQ buffer according to the HARQ scheme.

Example 75 includes the subject matter of any one of Examples 71-74, and optionally, comprising means for generating the compressed LLR values by compressing LLR values corresponding to the unsuccessfully-decoded transmission of a data block according to an LLR compression scheme; means for decompressing the compressed LLR values into de-compressed LLR values according to the LLR compression scheme; and means for generating the combined LLR values by combining the de-compressed LLR values and the LLR values corresponding the retransmission of the data block.

Example 76 includes the subject matter of Example 75, and optionally, comprising means for generating the compressed LLR values based on a modulation scheme of the unsuccessfully-decoded transmission of the data block.

Example 77 includes the subject matter of Example 75 or 76, and optionally, comprising means for generating a compressed LLR value by compressing an LLR value corresponding to a soft bit of the unsuccessfully-decoded transmission of the data block, wherein generating the compressed LLR value is based on a bit-index of the soft bit.

Example 78 includes the subject matter of Example 77, and optionally, comprising means for generating the compressed LLR value based on a predefined LLR mapping corresponding to the bit-index, the LLR mapping to map a plurality of possible LLR values to one or more possible compressed LLR values.

Example 79 includes the subject matter of Example 78, and optionally, wherein the LLR mapping is to map a plurality of possible LLR value ranges to a respective plurality of possible compressed LLR values.

Example 80 includes the subject matter of Example 79, and optionally, wherein the plurality of possible LLR value ranges are based on the bit-index.

Example 81 includes the subject matter of any one of Examples 78-80, and optionally, wherein a count of the one or more possible compressed LLR values is based on the bit-index.

Example 82 includes the subject matter of any one of Examples 78-81, and optionally, comprising means for, for a first retransmission of the data block, generating a first compressed LLR value corresponding to the soft bit value based on the predefined LLR mapping corresponding to the bit-index, and means for, for a subsequent retransmission of the data block, which is subsequent to the first retransmission, generating a subsequent compressed LLR value based on another LLR mapping, which is independent of the bit-index.

Example 83 includes the subject matter of any one of Examples 77-82, and optionally, comprising means for determining a selected mapping function from a plurality of predefined mapping functions based at least on the bit-index of the soft bit, and retrieving the compressed LLR value from the selected mapping function based on the LLR value corresponding to the soft bit.

Example 84 includes the subject matter of any one of Examples 75-83, and optionally, comprising means for generating the compressed LLR values based on a Signal to Noise Ratio (SNR) corresponding to the unsuccessfully-decoded transmission of the data block.

Example 85 includes the subject matter of any one of Examples 75-84, and optionally, comprising means for generating the compressed LLR values based on a retransmission number of the unsuccessfully-decoded transmission of the data block.

Example 86 includes the subject matter of any one of Examples 71-85, and optionally, wherein the bit size of the HARQ buffer is equal to or less than 2 times the supported HARQ Rx size.

Example 87 includes the subject matter of any one of Examples 71-86, and optionally, wherein a compressed LLR value of the plurality of compressed LLR values is to represent an LLR value corresponding to a soft bit of the unsuccessfully-decoded transmission of the data block, the LLR value having a bit size of at least 6 bits.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of wireless communication according to a Hybrid Automatic Repeat Request (HARQ) scheme, the apparatus comprising:
   a HARQ buffer configured to buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is reported to a transmitter of the data block; and
   a decoder configured to decode a retransmission of the data block according to the HARQ scheme based on combined LLR values, which are based on the compressed LLR values and on LLR values corresponding to the retransmission of the data block, wherein a HARQ gain of decoding the retransmission of the data block based on the combined LLR values is at least 2 Decibel (dB) for an Additive White Gaussian Noise (AWGN) channel.

2. The apparatus of claim 1, wherein the HARQ gain comprises a gain of a first decoding error probability relative to a second decoding error probability, the first decoding error probability comprising a decoding error probability of decoding the retransmission of the data block based on the combined LLR values, the second decoding error probability comprising a decoding error probability of decoding the data block without retransmission.

3. The apparatus of claim 1, wherein the HARQ gain of decoding the retransmission of the data block based on the combined LLR values is at least 2 dB for the AWGN channel and for any supported Modulation and Coding Scheme (MCS) for the retransmission of the data block.

4. The apparatus of claim 1, wherein the supported Rx size comprises a count of LLR values supported for buffering by the HARQ buffer according to the HARQ scheme.

5. The apparatus of claim 1 comprising:
   an LLR compressor to generate the compressed LLR values by compressing LLR values corresponding to the unsuccessfully-decoded transmission of the data block according to an LLR compression scheme;
   an LLR de-compressor to decompress the compressed LLR values into de-compressed LLR values according to the LLR compression scheme; and
   an LLR combiner to generate the combined LLR values by combining the de-compressed LLR values and the LLR values corresponding the retransmission of the data block.

6. The apparatus of claim 5, wherein the LLR compressor is configured to generate the compressed LLR values based on a modulation scheme of the unsuccessfully-decoded transmission of the data block.

7. The apparatus of claim 5, wherein the LLR compressor is configured to generate a compressed LLR value by compressing an LLR value corresponding to a soft bit of the unsuccessfully-decoded transmission of the data block, the LLR compressor is configured to generate the compressed LLR value based on a bit-index of the soft bit.

8. The apparatus of claim 7, wherein the LLR compressor is configured to generate the compressed LLR value based on a predefined LLR mapping corresponding to the bit-index, the LLR mapping to map a plurality of possible LLR values to one or more possible compressed LLR values.

9. The apparatus of claim 8, wherein the LLR mapping is to map a plurality of possible LLR value ranges to a respective plurality of possible compressed LLR values.

10. The apparatus of claim 9, wherein the plurality of possible LLR value ranges are based on the bit-index.

11. The apparatus of claim 8, wherein a count of the one or more possible compressed LLR values is based on the bit-index.

12. The apparatus of claim 8, wherein the LLR compressor is configured to:
for a first retransmission of the data block, generate a first compressed LLR value corresponding to the soft bit based on the predefined LLR mapping corresponding to the bit-index, and
for a subsequent retransmission of the data block, which is subsequent to the first retransmission, generate a subsequent compressed LLR value based on another LLR mapping, which is independent of the bit-index.

13. The apparatus of claim 7, wherein the LLR compressor is configured to determine a selected mapping function from a plurality of predefined mapping functions based at least on the bit-index of the soft bit, and to retrieve the compressed LLR value from the selected mapping function based on the LLR value corresponding to the soft bit.

14. The apparatus of claim 5, wherein the LLR compressor is configured to generate the compressed LLR values based on a Signal to Noise Ratio (SNR) corresponding to the unsuccessfully-decoded transmission of the data block.

15. The apparatus of claim 5, wherein the LLR compressor is configured to generate the compressed LLR values based on a retransmission number of the unsuccessfully-decoded transmission of the data block.

16. The apparatus of claim 1, wherein the bit size of the HARQ buffer is equal to or less than 2 times the supported HARQ Rx size.

17. The apparatus of claim 1, wherein a compressed LLR value of the compressed LLR values is to represent an LLR value corresponding to a soft bit of the unsuccessfully-decoded transmission of the data block, the LLR value having a bit size of at least 6 bits.

18. The apparatus of claim 1 comprising a radio to receive the transmission of the data block.

19. A wireless communication device configured for communication according to a Hybrid Automatic Repeat Request (HARQ) scheme, the wireless communication device comprising:
a memory to store instructions of an operating system of the wireless communication device;
a processor to execute the instructions of the operating system of the wireless communication device;
one or more antennas;
a radio connected to the one or more antennas to communicate over a wireless communication medium;
a HARQ buffer configured to buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is reported to a transmitter of the data block; and
a decoder configured to decode a retransmission of the data block according to the HARQ scheme based on combined LLR values, which are based on the compressed LLR values and on LLR values corresponding to the retransmission of the data block, wherein a HARQ gain of decoding the retransmission of the data block based on the combined LLR values is at least 2 Decibel (dB) for an Additive White Gaussian Noise (AWGN) channel.

20. The wireless communication device of claim 19 comprising:
an LLR compressor to generate the compressed LLR values by compressing LLR values corresponding to the unsuccessfully-decoded transmission of a datathe data block according to an LLR compression scheme;
an LLR de-compressor to decompress the compressed LLR values into de-compressed LLR values according to the LLR compression scheme; and
an LLR combiner to generate the combined LLR values by combining the de-compressed LLR values and the LLR values corresponding the retransmission of the data block.

21. The wireless communication device of claim 20, wherein the LLR compressor is configured to generate a compressed LLR value by compressing an LLR value corresponding to a soft bit of the unsuccessfully-decoded transmission of the data block, the LLR compressor is configured to generate the compressed LLR value based on a bit-index of the soft bit.

22. A product comprising one or more tangible computer-readable non-transitory storage media comprising computer-executable instructions operable to, when executed by at least one processor, enable the at least one processor to cause a wireless communication device to:
buffer in a Hybrid Automatic Repeat Request (HARQ) buffer compressed Log Likelihood Ratio (LLR) values corresponding to an unsuccessfully-decoded transmission of a data block, a bit size of the HARQ buffer is equal to or less than 2.5 times a supported HARQ receive (Rx) size, which is to be reported to a transmitter of the data block; and
decode a retransmission of the data block according to a HARQ scheme based on combined LLR values, which are based on the compressed LLR values and on LLR values corresponding to the retransmission of the data block, wherein a HARQ gain of decoding the retransmission of the data block based on the combined LLR values is at least 2 Decibel (dB) for an Additive White Gaussian Noise (AWGN) channel.

23. The product of claim 22, wherein the instructions, when executed, cause the wireless communication device to:
generate the compressed LLR values by compressing LLR values corresponding to the unsuccessfully-decoded transmission of the data block according to an LLR compression scheme;
decompress the compressed LLR values into de-compressed LLR values according to the LLR compression scheme; and
generate the combined LLR values by combining the de-compressed LLR values and the LLR values corresponding the retransmission of the data block.

24. The product of claim 23, wherein the instructions, when executed, cause the wireless communication device to generate the compressed LLR values based on a modulation scheme of the unsuccessfully-decoded transmission of the data block.

25. The product of claim 22, wherein a compressed LLR value of the compressed LLR values is to represent an LLR value corresponding to a soft bit of the unsuccessfully-decoded transmission of the data block, the LLR value having a bit size of at least 6 bits.

* * * * *

UNITED STATES PATENT AND TRADEMARK OFFICE
CERTIFICATE OF CORRECTION

| | |
|---|---|
| PATENT NO. | : 11,902,029 B2 |
| APPLICATION NO. | : 17/763641 |
| DATED | : February 13, 2024 |
| INVENTOR(S) | : Amir Rubin et al. |

It is certified that error appears in the above-identified patent and that said Letters Patent is hereby corrected as shown below:

In the Claims

In Column 32, beginning on Line 5 in Claim 20, delete "a datathe data block" and insert -- the data block --, therefor.

Signed and Sealed this
Second Day of July, 2024

Katherine Kelly Vidal
*Director of the United States Patent and Trademark Office*